United States Patent
Kubo et al.

(10) Patent No.: US 11,201,326 B2
(45) Date of Patent: Dec. 14, 2021

(54) METAL-ION SECONDARY BATTERY

(71) Applicant: SUMITOMO RUBBER INDUSTRIES, LTD., Kobe (JP)

(72) Inventors: Tatsuya Kubo, Kobe (JP); Akihiro Yamano, Yonezawa (JP); Masanori Morishita, Yonezawa (JP); Tetsuo Sakai, Yonezawa (JP); Hideya Yoshitake, Yonezawa (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 90 days.

(21) Appl. No.: 16/595,988

(22) Filed: Oct. 8, 2019

(65) Prior Publication Data

US 2020/0044251 A1 Feb. 6, 2020

Related U.S. Application Data

(63) Continuation of application No. 15/793,154, filed on Oct. 25, 2017, now abandoned.

(30) Foreign Application Priority Data

Nov. 25, 2016 (JP) .............................. JP2016-229426

(51) Int. Cl.
*H01M 4/505* (2010.01)
*H01M 4/38* (2006.01)
(Continued)

(52) U.S. Cl.
CPC ......... *H01M 4/505* (2013.01); *H01M 4/0471* (2013.01); *H01M 4/136* (2013.01);
(Continued)

(58) Field of Classification Search
CPC ...... H01M 4/505; H01M 4/38; H01M 4/1397; H01M 4/58; H01M 4/62; H01M 10/052; H01M 10/0569
See application file for complete search history.

(56) References Cited

U.S. PATENT DOCUMENTS 6,589,383 B1 7/2003 Takaoka et al.
2003/0219652 A1 11/2003 Yoshida et al.
(Continued)

FOREIGN PATENT DOCUMENTS

JP 2000-188095 A 7/2000
JP 2004-342605 A 12/2004
(Continued)

OTHER PUBLICATIONS

Japanese Office Action, dated Aug. 3, 2021, for Japanese Application No. 2017-214899, with an English machine translation.

*Primary Examiner* — Kenneth J Douyette
(74) *Attorney, Agent, or Firm* — Birch, Stewart, Kolasch & Birch, LLP (57) ABSTRACT

An object of the present disclosure is to provide a secondary battery having excellent cyclability by using a sulfur-based active material as a negative-electrode active material while preventing a reaction between an eluted polysulfide and a positive electrode. The metal-ion secondary battery comprises a negative electrode comprising a sulfur-containing compound as a negative-electrode active material, a positive electrode and an electrolyte, and has a polymer gel layer on a surface of the positive electrode.

11 Claims, 2 Drawing Sheets

(51) Int. Cl.
*H01M 4/1397* (2010.01)
*H01M 4/58* (2010.01)
*H01M 4/62* (2006.01)
*H01M 4/04* (2006.01)
*H01M 4/136* (2010.01)
*H01M 10/052* (2010.01)
*H01M 10/0569* (2010.01)
*H01M 4/1391* (2010.01)
*H01M 4/525* (2010.01)
*H01M 10/0525* (2010.01)
*H01M 4/02* (2006.01)

(52) U.S. Cl.
CPC ....... *H01M 4/1391* (2013.01); *H01M 4/1397* (2013.01); *H01M 4/38* (2013.01); *H01M 4/525* (2013.01); *H01M 4/5815* (2013.01); *H01M 4/625* (2013.01); *H01M 10/052* (2013.01); *H01M 10/0525* (2013.01); *H01M 10/0569* (2013.01); *H01M 2004/027* (2013.01); *H01M 2300/0028* (2013.01); *Y02T 10/70* (2013.01)

(56) References Cited

U.S. PATENT DOCUMENTS

| | | | |
|---|---|---|---|
| 2004/0111873 A1* | 6/2004 | Okawa | C01B 25/45 |
| | | | 29/623.1 |
| 2007/0231693 A1 | 10/2007 | Inagaki et al. | |
| 2014/0054492 A1 | 2/2014 | Mukai et al. | |
| 2016/0093887 A1 | 3/2016 | Jang et al. | |
| 2016/0118638 A1 | 4/2016 | Gronwald et al. | |
| 2016/0293955 A1* | 10/2016 | Hochi | H01M 4/583 |

FOREIGN PATENT DOCUMENTS

| | | |
|---|---|---|
| JP | 2007-273154 A | 10/2007 |
| JP | 2015-523693 A | 6/2015 |
| WO | WO 03/034518 A1 | 4/2003 |

* cited by examiner

METAL-ION SECONDARY BATTERY

CROSS REFERENCE TO RELATED APPLICATIONS

This application is a Continuation of application Ser. No. 15/793,154, filed on Oct. 25, 2017, now abandoned, which claims priority under 35 U.S.C. § 119(a) to Application No. 2016-229426, filed in Japan on Nov. 25, 2016, all of which are hereby expressly incorporated by reference into the present application.

TECHNICAL FIELD

The present disclosure relates to a metal-ion secondary battery, and in particular, to a metal-ion secondary battery comprising a negative electrode comprising a sulfur-based negative-electrode active material and a positive electrode having a polymer gel layer.

BACKGROUND OF THE INVENTION

A lithium-ion secondary battery is a secondary battery having a large charging and discharging capacity and enabling high output. A lithium-ion secondary battery has been mainly used as a power source for portable electronic devices and moreover, is expected as a power source for electric automobiles which are expected to spread in the future.

Most structures of a lithium-ion secondary battery use graphite as a negative-electrode active material and a lithium-manganese composite oxide as a positive-electrode active material (JP 2000-188095 A, WO 2003/034518 A1).

A secondary battery comprising a positive electrode comprising a lithium-manganese composite oxide and a negative electrode comprising graphite has a relatively large capacity, while a discharging voltage thereof is low. In addition, Li dendrites are produced due to a Li deposition and it may result in short-circuiting at overcharging.

Moreover, it is also proposed to use a lithium titanate as a negative-electrode active material instead of graphite (see, JP 2007-273154 A). In this case, since a voltage of a negative electrode becomes high, there is no production of Li dendrites and no fear of short-circuiting at overcharging, but on the other hand, a voltage of a battery becomes low and thus a capacity becomes small.

A sulfur-based active material has a high theoretical capacity of 1,675 mAh/g and for example, it is known that a lithium-ion secondary battery using sulfur as a positive-electrode active material can achieve about 6 times larger charging and discharging capacity than a lithium-ion secondary battery using lithium cobalt oxide which is a general positive-electrode material. Further, sulfur is low in reactivity compared to oxygen, and there is a less risk of causing firing, explosion, and the like due to overcharging. However, the lithium-ion secondary battery using elemental sulfur as the positive-electrode active material has a problem that a battery capacity is deteriorated through repeated charging and discharging. That is, sulfur likely generates a sulfide with lithium (lithium polysulfide: $Li_2S_x$) when discharging and since the generated sulfide is soluble into a nonaqueous electrolyte (for example, ethylene carbonate and dimethyl carbonate and the like) of the lithium-ion secondary battery, the charging and discharging capacity is gradually reduced through repeated charging and discharging due to the sulfur eluting into the electrolyte.

Further, since a sulfur-based positive electrode does not contain lithium like a conventional lithium transition metal oxide, when combined with a negative electrode, lithium needs to be inserted into a battery by a pre-doping treatment. For example, in the case where a negative electrode is doped with lithium, the following methods of inserting lithium can be given: an electrolytically-doping method, in which a half-cell is assembled using metallic lithium as the counter electrode and then doping lithium electrochemically; and an application pre-doping method, in which doping is done by a diffusion of lithium onto an electrode by applying a metallic lithium foil onto the electrode and then leaving the electrode with the metallic lithium foil applied as it is within an electrolytic solution.

SUMMARY OF THE INVENTION

In order to utilize properties of a sulfur-based active material, namely, large capacity thereof, and avoid a pre-doping treatment, it is considered to use a sulfur-based active material for a negative electrode. In this case, a source of lithium can be ensured by using a conventional lithium transition metal oxide for a positive electrode. However, charging and discharging are reversed compared to the case where a sulfur-based active material is used for a positive electrode and since an elution of a lithium polysulfide is resulted on a high potential side, under oxidizing atmosphere a side reaction is caused resulting in deterioration of a battery.

In the light of the above, an object of the present disclosure is to provide a secondary battery having excellent cyclability by using a sulfur-based active material as a negative-electrode active material while preventing a reaction between an eluted polysulfide and a positive electrode.

The present inventors have made intensive studies and as a result, have found that in the case where a sulfur-based negative-electrode active material is used in a negative electrode, a reaction between a polysulfide eluted from the sulfur-based active material used in the negative electrode and a positive electrode can be prevented by providing a polymer gel layer on a surface of the positive electrode and thus a metal-ion secondary battery exhibiting excellent cyclability can be provided. The present inventors have made further studies and have completed the present disclosure.

Namely, the present disclosure relates to:

[1] a metal-ion secondary battery comprising a negative electrode comprising a sulfur-containing compound as a negative-electrode active material, a positive electrode and an electrolyte, wherein the positive electrode has a polymer gel layer on a surface thereof,

[2] the metal-ion secondary battery of the above [1], wherein the electrolyte comprises sulfolane as a solvent,

[3] the metal-ion secondary battery of the above [1] or [2], wherein the positive electrode comprises a positive-electrode active material enabling lithium ion occlusion/release,

[4] the metal-ion secondary battery of the above [3], wherein the positive-electrode active material is at least one selected from the group consisting of a lithium transition metal oxide and a lithium transition metal oxide derivative,

[5] the metal-ion secondary battery of the above [3], wherein the positive-electrode active material is a lithium-manganese composite oxide,

[6] the metal-ion secondary battery of the above [5], wherein the lithium-manganese composite oxide is at least one selected from the group consisting of $LiNi_{1/3}Co_{1/3}Mn_{1/3}O_2$, $LiMn_2O_4$, $LiNi_{0.5}Mn_{1.5}O_4$ and $Li_2MnO_3$-$LiMO_2$ (wherein M is one or more selected from the group consisting of Ni, Co and Mn),

[7] the metal-ion secondary battery of any of the above [1] to [6], wherein the negative-electrode active material is obtainable by subjecting a starting material comprising at least one polymer compound selected from the group consisting of a rubber and a polymer which consists of a monomer unit having a hetero atom-containing moiety, and sulfur to heat-treatment under a non-oxidizing atmosphere, wherein the hetero atom-containing moiety is a moiety having a group selected from the group consisting of: a monovalent functional group containing at least one hetero atom selected from the group consisting of O, S, P and N; a heterocyclic group containing at least one hetero atom selected from the group consisting of O, S, P and N; and a group represented by —$S_a$— (wherein "a" is an integer of 2 to 4),

[8] the metal-ion secondary battery of the above [7], wherein a weight-average molecular weight of the polymer compound is 2,000 to 1,500,000, preferably 2,000 to 1,300,000, more preferably 2,000 to 1,200,000, further preferably 2,000 to 1,100,000, further preferably 2,000 to 1,000,000,

[9] the metal-ion secondary battery of the above [7] or [8], wherein the starting material to be heat-treated further comprises an electrically-conductive carbon material,

[10] the metal-ion secondary battery of the above [9], wherein the electrically-conductive carbon material is a carbon material having a graphite structure, and

[11] the metal-ion secondary battery of any of the above [1] to [10], wherein a total sulfur amount in the negative-electrode active material is not less than 50.0% by mass, preferably not less than 51.0% by mass, more preferably not less than 52.0% by mass, further preferably not less than 53.0% by mass, further preferably not less than 54.0% by mass, further preferably not less than 55.0% by mass.

According to the metal-ion secondary battery of the present disclosure, which uses a sulfur-based active material in a negative electrode and provides a polymer gel layer on a positive electrode, a reaction between a polysulfide eluted from the sulfur-based active material used in the negative electrode and the positive electrode is inhibited and excellent cyclability can be obtained. Additionally, since a sulfur-based active material is used in a negative electrode, there is no necessity of conducting a pre-doping treatment of lithium.

Herein "cyclability" means a property of maintaining a charging and discharging capacity of a secondary battery in spite of repeated charging and discharging. Therefore, while, as the charging and discharging are repeated, a lithium-ion secondary battery in which a degree of reduction of a charging and discharging capacity is large and a capacity retention rate is low is inferior in cyclability, a lithium-ion secondary battery in which a degree of reduction of a charging and discharging capacity is small and a capacity retention rate is high is excellent in cyclability.

DETAILED DESCRIPTION

Embodiments of the present disclosure are explained below in detail.

The metal-ion secondary battery according to the present disclosure comprises a negative electrode comprising a sulfur-containing compound as a negative-electrode active material, a positive electrode and an electrolyte, and has a polymer gel layer on the positive electrode surface. In the case where a sulfur-based compound containing sulfur is used as a negative-electrode active material, the sulfur-based active material can be configured, for example, such that sulfur molecules are entrapped inside a carbon skeleton by compounding sulfur into a rubber material, thereby preventing sulfide (for example, $Li_2S$) from eluting into the electrolyte from the sulfur-based active material. While this attempts to improve a cycle life of the secondary battery, due to the expansion/contraction of the active material during charging and discharging cycles, a tiny amount of sulfide is eluted into the electrolyte. If this electrolyte in which the sulfide is dissolved reaches the positive electrode side by a convective diffusion and comes into contact with a high potential positive-electrode active material, the sulfide is oxidized into sulfur. When the sulfide in the electrolyte is consumed in this oxidization reaction, the elution of the sulfide from the negative electrode is promoted and deterioration is accelerated. Therefore, in the present disclosure, by gel-coating the positive electrode surface (providing a polymer gel layer on the positive electrode surface), the sulfide can be prevented from being diffused inside the electrode and being oxidatively consumed by contacting with the positive-electrode active material.

<Positive Electrode>

It is preferable that a positive electrode used in the metal-ion secondary battery according to one embodiment of the present disclosure comprises a positive-electrode active material which can occlude/discharge, for example, a lithium ion, a sodium ion or the like. The positive electrode can be prepared from a current collector and a positive-electrode active material layer comprising a positive-electrode active material that covers a surface of the current collector. The positive-electrode active material can be used as a positive electrode material together with a binder and/or an electrically-conductive additive. The current collector, the binder and the electrically-conductive additive are not limited particularly and ones similar to those used for a negative electrode material as described below can be used.

Examples of the positive-electrode active material which can occlude/discharge a lithium ion include metal composite oxides of lithium and a transition metal such as a lithium-manganese composite oxide, a lithium-cobalt composite oxide, a lithium-nickel composite oxide and the like. A lithium-manganese composite oxide is, for example, preferably one or more selected from the group consisting of $LiNi_{1/3}Co_{1/3}Mn_{1/3}O_2$, $LiMn_2O_4$, $LiNi_{0.5}Mn_{1.5}O_4$ and $Li_2MnO_3$-$LiMO_2$ (wherein M is one or more selected from the group consisting of Ni, Co and Mn). A lithium-cobalt composite oxide is preferably for example $LiCoO_2$. A lithium-nickel composite oxide is preferably one or more selected from the group consisting of $LiNiO_2$, $LiNi_{1/3}Co_{1/3}Mn_{1/3}O_2$, $LiMn_2O_4$, $LiNi_{0.5}Mn_{1.5}O_4$ and $Li_2MnO_3$-$LiMO_2$ (wherein M is one or more selected from the group consisting of Ni, Co and Mn).

Examples of the positive-electrode active material which can occlude/discharge a sodium ion include materials where Li of active materials for Li ion battery are replaced by Na, for example, metal composite oxides of sodium and a transition metal such as $NaMO_2$ (wherein M is one or more selected from the group consisting of Ni, Co and Mn), $NaMPO_4$ (wherein M is one or more selected from the group consisting of Ni, Co and Mn) and the like.

<Polymer Gel Layer>

Polymers used for the polymer gel layer are not limited particularly and polymers which can swell by a solvent and gels can be used. Specific examples of polymers used for the polymer gel layer include: polymers such as polyvinyl alcohol, polyethylene glycol, polyvinylidene fluoride, polyethylene oxide, polyacrylamide, polyacetal, sodium polyacrylate, carboxymethyl cellulose, polyvinyl chloride, polycarbosilane and the like; polymers such as 2-hydroxyethyl methacrylate (2-HEMA) where monomers are copolymerized; natural polymers such as gelatin and agar, and the like.

Solvents which swell the above polymer for coating the polymer gel on the positive electrode surface are not limited particularly and ones used in the art, such as, acetone, dimethylformamide, N-methylpyrrolidone, isopropyl alcohol, acetonitrile and the like can be used depending on the polymer to be used.

As a method for coating the polymer gel on the positive electrode surface, any method can be used without limitation as long as it is known as a method for coating a polymer gel. Specific examples thereof include spin coating, doctor blade coating, dip coating and the like.

<Negative Electrode>

The negative electrode used in a metal-ion secondary battery according to the present disclosure can be produced in the same manner as in a general negative electrode of a lithium-ion secondary battery except that a sulfur-based active material as described below is used as a negative-electrode active material. For example, a particulate of the sulfur-based active material is mixed with an electrically-conductive additive, a binder and a solvent to prepare a paste-like negative electrode material and the negative electrode material is applied on a current collector and dried to produce a negative electrode. Otherwise, it is also possible that the sulfur-based active material is kneaded together with an electrically-conductive additive, a binder and a small amount of solvent using a mortar or the like, and the kneaded mixture is formed into a film shape and then pressed against a current collector using a pressing machine or the like to produce a negative electrode.

[Sulfur-Based Negative-Electrode Active Material]

A sulfur-based negative-electrode active material is used for a negative electrode of the metal-ion secondary battery according to the present disclosure. The sulfur-based negative-electrode active material is not limited particularly as long as it is a compound comprising sulfur, and is obtainable by subjecting a starting material consisting of at least one polymer compound selected from the group consisting of a rubber and a polymer consisting of a monomer unit having a hetero atom-containing moiety, and sulfur to heat treatment under a non-oxidizing atmosphere, wherein the hetero atom-containing moiety is a moiety having a group selected from the group consisting of a monovalent functional group containing at least one hetero atom selected from the group consisting of O, S, P and N, a heterocyclic group containing at least one hetero atom selected from the group consisting of O, S, P and N, and a group represented by $—S_a—$ (wherein "a" is an integer of 2 to 4).

(Polymer Compound)

The polymer compound in the present disclosure is at least one polymer compound selected from the group consisting of polymers which consist of a rubber and a monomer unit having a hetero atom-containing moiety.

(Rubber)

Preferable examples of the rubber include diene rubbers such as a natural rubber, an isoprene rubber, a butadiene rubber and the like. The rubber can be used alone, or two or more thereof can be used in combination. Among these, a natural rubber and a high-cis polybutadiene rubber are particularly preferable. Since the both rubbers likely have an irregular structure where molecular chains are bent and can relatively decrease the intermolecular force between the adjacent molecular chains to hardly allow crystallization, the softness and processability of the sulfur-based active material can be improved. It is particularly preferable that a butadiene rubber such as a high-cis polybutadiene rubber is used. Here, the high-cis polybutadiene rubber is a polybutadiene rubber in which the content of cis-1,4 bond is not less than 95% by mass. It is noted that the content of cis-1,4 bond is calculated by infrared absorption spectrum analysis.

It is also noted that in the present disclosure, the rubber is supplied in an unvulcanized state as a starting material of the sulfur-based active material.

(Polymer Consisting of a Monomer Unit Having a Hetero Atom-Containing Moiety)

In the present disclosure, "a hetero atom-containing moiety" is a moiety having a group selected from the group consisting of a monovalent functional group containing at least one hetero atom selected from the group consisting of O, S, P and N, a heterocyclic group containing at least one hetero atom selected from the group consisting of O, S, P and N, and a group represented by $—S_a—$ ("a" is an integer of 2 to 4).

An example of "a monovalent functional group containing a hetero atom selected from the group consisting of O, S, P and N" is at least one selected from the group consisting of, for example, a hydroxyl group, a sulfonic acid group, a carboxyl group, a phosphate group and an ammonium group. The monovalent functional group may have a substituent group.

In this case, examples of the substituent group include the above-mentioned functional groups. Namely, these monovalent functional groups may be further replaced with another monovalent functional group or the same monovalent functional group as above, and the replacement can be made plural times. In that case, a spacer such as an alkylene group may be present between the monovalent functional groups. Examples of the alkylene group include those having 1 to 4 carbon atoms such as methylene, ethylene and trimethylene.

An example of "a heterocyclic group containing a hetero atom selected from the group consisting of O, S, P and N" is a 5- to 14-membered heterocyclic groups containing 1 to 3 hetero atoms selected from the group consisting of O, S, P and N. Here, a heterocyclic ring constituting the heterocyclic group may be, for example, a monocyclic ring such as pyrrolidine, pyrrole, pyridine, imidazole, pyrolidone, tetrahydrofuran, triazine, thiophene, oxazole, thiazole or phosphole, or a polycyclic ring such as indole, benzimidazole, quinoline, carbazole, thianthrene, phenoxazine, phenothiazine, xanthene, thieno[3,2-b]thiophene, benzothiophene or phosphindole, and is selected from the group consisting thereof. These heterocyclic groups may have a substituent group, or may be an unsubstituted group. In the case where the heterocyclic group has a substituent group, examples of the substituent group include the above-mentioned monovalent functional groups.

Preferred examples of "the polymer consisting of a monomer unit having a hetero atom-containing moiety" include those represented by the following formula (1) or formula (2):

(1)

wherein $R^1$ represents a hydrogen atom or an alkyl group, $X^1$ represents a group having a monovalent functional group containing a hetero atom selected from the group consisting of O, S, P and N, or a group having a heterocyclic group containing a hetero atom selected from the group consisting of O, S, P and N, "n" represents an integer;

(2)

wherein $R^2$ represents an alkyl group, "a" represents an integer of 2 to 4, "m" represents an integer of 2 to 12.

In the formula (1), the alkyl group of $R^1$ is preferably one having 1 to 4 carbon atoms and is particularly preferably methyl. In the formula (2), the alkyl group of $R^2$ is preferably one having 5 to 12 carbon atoms, more preferably one having 6 to 10 carbon atoms, further preferably one having 7 to 9 carbon atoms, most preferably one having 8 carbon atoms.

Herein the alkyl group is either of one having a straight chain and one having a branched chain, and the one having a straight chain is preferred.

More preferred specific examples of the polymer consisting of a monomer unit having a hetero atom-containing moiety include, without limitation, at least one selected from the group consisting of polyvinylpyridine, a phosphorylcholine polymer, an alkylphenol-sulfur chloride condensate, and a polystyrene sulfonic acid. Further, a preferred polymer is one having a hetero atom-containing moiety in its side chain.

Polyvinylpyridine is a compound represented by the following formula (3):

(3)

wherein $q^1$ represents an integer.

There exist, as the above-mentioned polyvinylpyridine, three isomers such as poly(2-vinylpyridine), poly(3-vinylpyridine) and poly(4-vinylpyridine), and among these, poly(4-vinylpyridine) is preferred.

An example of the phosphorylcholine polymer is a compound (2-methacryloyloxyethyl phosphorylcholine polymer) represented by the following formula (4):

(4)

wherein $q^2$ represents an integer.

An example of the alkylphenol-sulfur chloride condensate is a compound represented by the following formula (5):

(5)

wherein $R^3$ represents an alkyl group having 5 to 12 carbon atoms, $q^3$ represents an integer.

The alkyl group of $R^3$ is preferably one having 6 to 10 carbon atoms, more preferably one having 7 to 9 carbon atoms, further preferably one having 8 carbon atoms.

The compound represented by the formula (5) is preferably a condensate of octylphenol and sulfur chloride (brand name Tackirol V200 manufactured by Taoka Chemical Co., Ltd.).

An example of the polystyrene sulfonic acid is a compound represented by the following formula (6):

(6)

wherein $q^4$ represents an integer.

There exist, as the above-mentioned polystyrene sulfonic acid, three isomers such as poly(o-styrenesulfonic acid), poly(m-styrenesulfonic acid) and poly(p-styrenesulfonic acid), and among these, poly(p-styrenesulfonic acid) is preferred.

(Weight-Average Molecular Weight (Mw) of Polymer Compound)

The Mw of the polymer compound is preferably 2,000 to 1,500,000. When the Mw is not less than 2,000, there is a tendency that an amount of sulfur to be incorporated into the carbon skeleton derived from the polymer compound increases during the heat treatment. On the other hand, the amount of sulfur hardly increases even if the Mw exceeds 1,500,000 and the Mw of not more than 1,500,000 tends to achieve the suitable content of sulfur. Further, when the Mw is not more than 1,500,000, which makes process advantageous, for example, mixing with sulfur is easier. The Mw of the polymer is more preferably within a range from 2,000 to 1,300,000, more preferably within a range from 2,000 to 1,200,000, further preferably within a range from 2,000 to 1,100,000, still further preferably within a range from 2,000 to 1,000,000. The Mw is a value (calibrated based on polystyrene) measured by gel permeation chromatography (GPC).

(Purchase or Production of Polymer Compound)

The polymer compound is commercially available or can be prepared by a usual process within a scope of knowledge of a person ordinarily skilled in the art.

(Sulfur)

While sulfur in various forms such as powdery sulfur, insoluble sulfur, precipitated sulfur, colloidal sulfur and the like may be used, precipitated sulfur and colloidal sulfur are preferable. The compounded amount of the sulfur is preferably not less than 250 parts by mass, more preferably not less than 300 parts by mass based on 100 parts by mass of the polymer compound. When the compounded amount is not less than 250 parts by mass, there is a tendency that a charging and discharging capacity and cyclability can be improved. On the other hand, while there is no upper limit of the compounded amount of sulfur, the compounded amount is usually not more than 1,500 parts by mass, preferably not more than 1,250 parts by mass. Even if the ratio exceeds 1,500 parts by mass, there is a tendency that a charging and discharging capacity or cyclability cannot be improved sufficiently, and there is a tendency that the amount of not more than 1,500 parts by mass is advantageous from the viewpoint of the cost.

(Vulcanization Accelerator)

In the present disclosure, a vulcanization accelerator is not limited particularly and various vulcanization accelerators can be used. Among these, it is preferable to use an ultra-facilitative vulcanization accelerator which is a vulcanization accelerator allowing a fast vulcanization.

The compounded amount of the vulcanization accelerator is preferably not less than 3 parts by mass, more preferably not less than 10 parts by mass, further preferably not less than 15 parts by mass based on 100 parts by mass of the polymer compound. When the compounded amount is not less than 3 parts by mass, there is a tendency that the object of further improving the charging and discharging capacity and cyclability can be easily achieved. On the other hand, the compounded amount is preferably not more than 250 parts by mass, more preferably not more than 50 parts by mass, further preferably not more than 40 parts by mass. There is a tendency that the charging and discharging capacity and cyclability are not improved more even if the compounded amount exceeds 250 parts by mass, which is disadvantageous in terms of the cost.

In the present disclosure, the ultra-facilitative vulcanization accelerator refers to a vulcanization accelerator which allows a fast vulcanization and is a concept including ones commercially distributed as what is called "an ultra-vulcanization accelerator". In the ultra-facilitative vulcanization accelerator, for example, in the case where a rubber is vulcanized therewith, an increase of a torque associated with a progress of a vulcanization time in a curing curve appears fast. Thiuram vulcanization accelerators, dithiocarbamate vulcanization accelerators and xanthate vulcanization accelerators or vulcanization accelerators which exhibit the similar fast-acting property as these can be used as such ultra-facilitative vulcanization accelerator. Examples of thiuram vulcanization accelerators include tetramethylthiuram disulfide, tetraethylthiuram disulfide, tetrabutylthiuram disulfide, tetrakis(2-ethylhexyl)thiuram disulfide, tetramethylthiuram monosulfide, dipentamethylenethiuram tetrasulfide and the like; examples of dithiocarbamate vulcanization accelerators include piperidinium pentamethylene dithiocarbamate, zinc dimethyldithiocarbamate, zinc diethyldithiocarbamate, zinc dibutyldithiocarbamate, zinc N-ethyl-N-phenyldithiocarbamate, zinc N-pentamethylenedithiocarbamate, zinc dibenzyldithiocarbamate, sodium dibutyldithiocarbamate, copper dimethyldithiocarbamate, ferric dimethyldithiocarbamate, tellurium diethyldithiocarbamate and the like; and examples of xanthate vulcanization accelerators include zinc isopropylxanthate and the like. Among these, the thiuram vulcanization accelerators and the dithiocarbamate vulcanization accelerators are preferable and among these, tetramethylthiuram monosulfide, zinc dimethyldithiocarbamate, zinc diethyldithiocarbamate, zinc dibutyldithiocarbamate and the like are preferable. One or more kinds of ultra-facilitative vulcanization accelerators can be used.

In the present disclosure, not only the ultra-facilitative vulcanization accelerator but also slow-acting vulcanization accelerators can be used. In the slow-acting vulcanization accelerator, for example, in the case where a rubber is vulcanized therewith, an increase of a torque associated with a progress of a vulcanization time in a curing curve appears slow. In the present disclosure, sulfenamide vulcanization accelerators and thiazole vulcanization accelerators, which are generally known as slow-acting vulcanization accelerators, or vulcanization accelerators which exhibit the similar slow-acting property as these can be used. Specific examples of such slow-acting vulcanization accelerators include N-cyclohexyl-2-benzothiazolyl sulfenamide, N, N-dicyclohexyl-2-benzothiazolyl sulfenamide, N-oxydiethylene-2-benzothiazolyl sulfenamide, 2-(4'-morpholinodithio)benzothiazole, 2-(N, N-diethylthiocarbamoylthio)benzothiazole, 2-mercaptobenzothiazole, di-2-benzothiazolyl disulfide and the like and among these, N-cyclohexyl-2-benzothiazolyl sulfenamide, di-2-benzothiazolyl disulfide and the like are preferable. One or more kinds of slow-acting vulcanization accelerators can be used.

(Electrically-Conductive Carbon Material)

In the present disclosure, a carbon material having electric conductivity may be further added to the starting material to be heat-treated for the purpose of enhancing electric conductivity of the obtained sulfur-based active material. A carbon material having a graphite structure is preferable as such an electrically-conductive carbon material. Examples of usable carbon material include carbon materials having a fused aromatic ring structure such as carbon black, acetylene black, Ketjen black, graphite, carbon nanotube (CNT), carbon fiber (CF), graphene, fullerene and the like. One or more thereof can be used as the electrically-conductive carbon material.

Among these, acetylene black, carbon black and Ketjen black are preferable since these are inexpensive and excellent in dispersibility. Also, a small amount of CNT or graphene may be combined with acetylene black, carbon black or Ketjen black. In accordance with such combination, cyclability of a lithium-ion secondary battery can be further improved without largely increasing the cost. The combined amount of CNT or graphene is preferably not less than 8% by mass and not more than 12% by mass based on the total amount of electrically-conductive carbon material.

The compounded amount of the electrically-conductive carbon material is preferably not less than 5 parts by mass, more preferably not less than 10 parts by mass based on 100 parts by mass of the polymer compound. When the compounded amount is not less than 5 parts by mass, a purpose of further enhancing a charging and discharging capacity and cyclability tends to be easily achieved. On the other hand, the compounding amount is preferably not more than 50 parts by mass, more preferably not more than 40 parts by mass. When the compounded amount is not more than 50 parts by mass, there is a tendency that a purpose of further enhancing a charging and discharging capacity and cyclability is easily achieved without relatively lowering a ratio of a sulfur-containing structure in the sulfur-based active material.

(Other Materials)

To the starting material to be heat-treated can be added other materials usually used in the field as necessary.

(Production of Sulfur-Based Negative-Electrode Active Material)

In the present disclosure, the sulfur-based negative-electrode active material can be produced by a production method comprising a process of heat-treating the starting material comprising the polymer compound, the sulfur and optionally the vulcanization accelerator under a non-oxidizing atmosphere. In the heat treatment process, a predetermined temperature elevation rate and a predetermined heat treatment temperature are adopted.

(Heat Treatment Process)

<Kneading/Fining of Starting Material>

For heat treatment, it is desirable that the materials which compose the starting material are previously kneaded. Further, it is desirable that the thus obtained kneaded product is fined. Fining refers to pulverization or fine cutting with scissors of the starting material. Kneading and fining are effective means for improving reactivity in heat treatment.

<Non-Oxidizing Atmosphere>

The non-oxidizing atmosphere means an atmosphere substantially containing no oxygen and is used to prevent an oxidative deterioration or an excess thermal decomposition of the components. Specifically, the non-oxidizing atmosphere means an inert gas atmosphere such as nitrogen or argon. Accordingly, the heat treatment is carried out, for example, in a silica tube under an inert gas atmosphere.

<Temperature Elevation Rate>

The temperature elevation rate is an elevation rate of temperature when the starting material is heated in the heat treatment process. In the present disclosure, it is preferable that the temperature elevation rate is within a predetermined range, that is, a range of 50 to 1,200° C./h, more preferably 100 to 1,150° C./h, further preferably 130 to 1,100° C./h. When the temperature elevation rate is within such range, the object of improving the charging and discharging capacity and cyclability tends to be easily achieved. Further, in the case where a vulcanization accelerator is used, it is preferable that the temperature elevation rate is changed depending on the kind of vulcanization accelerator. When an ultra-facilitative vulcanization accelerator is used, the temperature elevation rate is preferably within a range of 300 to 1,200° C./h and when a slow-acting vulcanization accelerator is used, the temperature elevation rate is preferably within a range of 50 to 250° C./h.

<Temperature/Time of Heat Treatment>

The temperature of the heat treatment is a temperature reached after finishing the temperature elevation of the starting material and refers to a temperature which is maintained for a predetermined period of time for heat-treating the starting material. The temperature of the heat treatment is preferably within a range of 250° C. to 550° C. When the heat-treating temperature is not lower than 250° C., there is a tendency that an insufficient sulfurizing reaction is avoided and lowering of a charging and discharging capacity of the target product can be prevented. On the other hand, when not higher than 550° C., there is a tendency that decomposition of the starting material can be prevented and decrease in yield and lowering of a charging and discharging capacity can be prevented. It is more preferable that the heat-treating temperature is not lower than 300° C. and not higher than 450° C. While a period of time for the heat treatment can be set according to the type of the starting material, the temperature of the heat treatment and the like, for example, a period of time for the heat treatment is preferably one to six hours. When the heat-treating time is not less than one hour, there is a tendency that the heat treatment can be advanced sufficiently, and when the heat-treating time is not more than six hours, there is a tendency that excessive thermal decomposition of the components can be prevented.

<Apparatus>

The heat treatment process can be conducted using, for example, a continuous apparatus such as a twin-screw extruder. In this case, there is an advantage that the sulfur-based active material can be continuously produced in the apparatus by a series of operations, such as, heat treating the starting material while pulverizing/mixing the same.

<Residues Removing Process>

In the treated product obtained after the heat treatment, there remains unreacted sulfur which results from cooling and deposition of sulfur sublimated at the heat treatment and the like. It is desirable to remove such residues as much as possible since they cause deterioration of cyclability. Residues can be removed by usual methods, for example, a removal by heating under a reduced pressure, a removal by warm wind, a removal by washing with a solvent and the like.

<Pulverization/Classification>

The produced sulfur-based active material is pulverized so as to be predetermined grain sizes and is classified to be particles suitable for production of an electrode. A preferred particle size distribution of the particles is from about 5 to 25 μm in a median size. It is noted that in the above-explained heat treatment method using a twin-screw extruder, the produced sulfur-based active material can also be pulverized at the same time due to shearing at kneading.

The thus obtained sulfur-based negative-electrode active material is mainly composed of carbon and sulfur and as the amount of sulfur increases, a charging and discharging capacity and cyclability tend to be improved. Therefore, there is a tendency that the content of sulfur as large as possible is preferable. Generally, the preferable range of sulfur amount is not less than 50.0% by mass in the sulfur-based active material, and more preferably not less than 51.0% by mass, further preferably not less than 52.0% by mass, further preferably not less than 53.0% by mass, further preferably not less than 54.0% by mass, further preferably not less than 54.5% by mass in the sulfur-based active material. In the case where an electrically-conductive carbon material is compounded, even if the sulfur content is decreased in some degree, an effect of enhancing a charging and discharging capacity and cyclability can be expected due to an influence of carbon constituting the electrically-conductive carbon material. In such a case, the content of sulfur may lower the above sulfur amount by about 5.0% by mass.

(Binder)

Examples of a binder include polyvinylidene difluoride (PVDF), polytetrafluoroethylene (PTFE), styrene-butadiene rubber (SBR), polyimide (PI), polyamide-imide (PAI), carboxymethyl cellulose (CMC), polyvinyl chloride (PVC), methacryl resins (PMA), polyacrylonitrile (PAN), modified polyphenylene oxide (PPO), polyethylene oxide (PEO), polyethylene (PE), polypropylene (PP), acrylic copolymers and the like. One or more thereof can be used as the binder.

(Solvent)

Examples of a solvent include N-methyl-2-pyrrolidone (NMP), N,N-dimethylformaldehyde, alcohols, hexane, water and the like. One or more thereof can be used as the solvent.

(Compounded Amount)

The compounded amounts of each of the above components constituting the negative electrode is not limited particularly but for example, it is preferable to compound 20 to 100 parts by mass of an electrically-conductive additive, 10 to 20 parts by mass of a binder and an appropriate amount of a solvent based on 100 parts by mass of the negative-electrode active material.

(Current Collector)

As for a current collector, those which have been used commonly on electrodes for a secondary battery may be used. Examples of a current collector include aluminum foils, aluminum meshes, punched aluminum sheets, aluminum expanded sheets, stainless-steel foils, stainless-steel meshes, punched stainless-steel sheets, stainless-steel expanded sheets, foamed nickel, nickel nonwoven fabrics, copper foils, copper meshes, punched copper sheets, copper expanded sheets, titanium foils, titanium meshes, carbon nonwoven fabrics, carbon woven fabrics and the like. Among these, a carbon nonwoven fabric current collector and a carbon woven fabric current collector, which are composed of carbon with a high graphitization degree, are suitable for a current collector in the case of using the sulfur-based active material as a negative-electrode active material because it does not include hydrogen and has low reactivity to sulfur. As for a starting material for a carbon fiber with a high graphitization degree, it is possible to use various types of pitches (namely, the byproducts of petroleum, coal, coal tar, and so on) that make a material for carbon fibers, or polyacrylonitrile fibers (PAN) and the like.

<Electrolyte>

As for an electrolyte to be used on the metal-ion secondary battery, it is possible to use those in which an alkali-metal salt serving as an electrolyte is dissolved in an organic solvent and a nonaqueous solvents obtained by dissolving an electrolyte into a nonaqueous solvent in which water content is reduced as much as possible are preferable from the viewpoint of the prevention of gas generation at charging.

It is preferable to use, as the nonaqueous solvent, at least one selected from nonaqueous solvents, such as ethylene carbonate, propylene carbonate, dimethyl carbonate, diethyl carbonate, ethyl methyl carbonate, dimethyl ether, isopropyl methyl carbonate, vinylene carbonate, γ-butyrolactone, sulfolane and acetonitrile. Among these, it is preferable to use sulfolane since it has a high viscosity and an elution of a lithium polysulfide is hard to be generated.

In the case where the metal-ion secondary battery is a lithium-ion secondary battery, examples of a usable electrolyte include $LiPF_6$, $LiBF_4$, $LiAsF_6$, $LiCF_3SO_3$, $LiI$, $LiN(SO_2CF_3)_2$, $LiClO_4$ and the like. In the case where the metal-ion secondary battery is a sodium-ion secondary battery, examples of a usable electrolyte include $NaPF_6$, $NaBF_4$, $NaClO_4$, $NaAsF_6$, $NaSbF_6$, $NaCF_3SO_3$, $NaN(SO_2CF_3)_2$, lower fatty acid sodium salt, $NaAlCl_4$ and the like. One or more of these electrolytes can be used. Among these, $LiPF_6$, $LiBF_4$, $LiAsF_6$, $LiCF_3SO_3$, $LiN(SO_2CF_3)_2$, $NaPF_6$, $NaBF_4$, $NaAsF_6$, $NaSbF_6$, $NaCF_3SO_3$, $NaN(SO_2CF_3)_2$ and the like are preferable since they include fluorine and therefore form a coating of a fluoride on the current collector of an aluminum foil used for a positive electrode and can prevent an elution of aluminum. A concentration of the electrolyte can be from about 0.5 mol/liter to 1.7 mol/liter.

In addition to the above-described negative electrode, positive electrode and electrolyte, the metal-ion secondary battery can be further equipped with the other members, such as separators, as well. A separator intervenes between the positive electrode and the negative electrode, thereby not only allowing the movements of ions between the positive electrode and the negative electrode but also functioning to prevent the positive electrode and the negative electrode from internally short-circuiting one another. When the secondary battery is a hermetically-closed type, a function of retaining the electrolytic solution is required for the separator. As for a separator, it is preferable to use a thin-thickness and microporous or nonwoven-shaped film that is made of a material, such as polyethylene, polypropylene, PAN, aramid, polyimide, cellulose, glass and the like. A configuration of the secondary battery is not limited particularly, and can be formed as a variety of configurations, such as cylindrical types, laminated types, coin types and the like.

The secondary battery can be loaded into automobiles such as electric automobiles, hybrid automobiles and the like. The secondary battery can be also loaded into battery-driven various home appliances, office devices and industrial devices such as personal computers, portable communication devices and the like.

EXAMPLE

The present disclosure is explained by means of Examples, but is not limited to the Examples.

Various chemicals used in Examples and Comparative examples are collectively shown below. The various chemicals were subjected to purification according to necessity by a usual method.

Polymer compound 1: high-cis butadiene rubber (BR150L manufactured by Ube Industries, Ltd.: cis-1,4 bond content: 98% by mass, weight-average molecular weight: 600,000)

Polymer compound 2: condensate of octylphenol and sulfur chloride (Tackirol V200 manufactured by Taoka Chemical Co., Ltd.) (sulfur content: 24% by mass, weight-average molecular weight: 9,000) Electrically-conductive carbon material: acetylene black (Denka black (registered trade mark) manufactured by Denka Company Limited) Vulcanization accelerator: tetramethylthiuram monosulfide (Nocceler TS manufactured by OUCHI SHINKO CHEMICAL INDUSTRIAL CO., LTD.)

Sulfur: colloidal sulfur manufactured by TSURUMI CHEMICAL INDUSTRY CO., LTD.

Example 1

<Preparation of Starting Material>

100 Parts by mass of the polymer compound 1 was kneaded with 1,000 parts by mass of the colloidal sulfur and 25 parts by mass of the vulcanization accelerator in a kneader (kneading testing device MIX-LABO manufactured by Moriyama Company, Ltd.) to prepare a starting material. The thus obtained starting material was cut into small pieces of not more than 3 mm using scissors and then was subjected to heat treatment.

(Reaction Apparatus)

Figure 2:
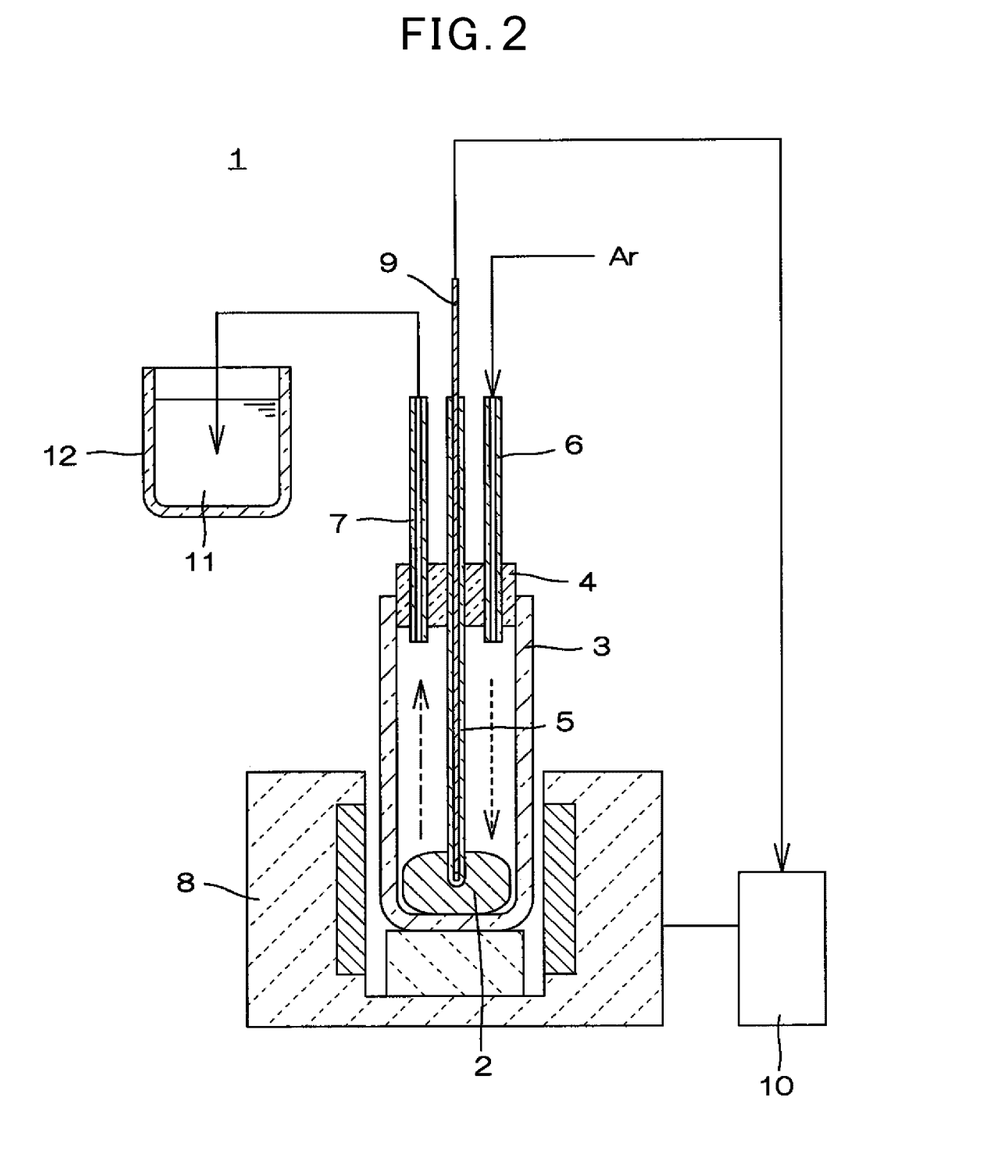
FIG. 2 is a sectional view graphically illustrating a reaction apparatus used for production of a sulfur-based active material in Examples of the present disclosure.

A reaction apparatus 1 as illustrated in FIG. 2 was used for heat treatment of the starting material. The reaction apparatus 1 comprises a reaction container 3, which has an outer diameter of 60 mm, an inner diameter of 50 mm and a height of 300 mm and is made of quartz glass, that is formed as a bottomed cylindrical shape to contain and heat-treat the starting material 2; a silicone plug 4 for closing an upper opening of the reaction container 3; one alumina protection tube 5 ("Alumina SSA-S" available from NIKKATO CORPORATION, an outer diameter of 4 mm, an inner diameter of 2 mm and a length of 250 mm) and two tubes, which are a gas introducing tube 6 and a gas exhausting tube 7 (both are "Alumina SSA-S" available from NIKKATO CORPORATION, an outer diameter of 6 mm, an inner diameter of 4 mm and a length of 150 mm), these three tubes penetrating through the plug 4; and an electric furnace 8 (crucible furnace, width of an opening: 80 mm dia., heating height: 100 mm) for heating the reaction container 3 from the bottom side.

The alumina protection tube 5 is formed in such a length that the lower part below plug 4 reaches the starting material 2 contained in the bottom of the reaction container 3 and a thermocouple 9 is inserted through the inside of the alumina protection tube 5. The alumina protection tube 5 is used as a protective tube for the thermocouple 9. The leading end of the thermocouple 9 is inserted into the starting material 2 while being protected by the closed leading end of the alumina protection tube 5 and functions to measure a temperature of the starting material 2. Output of the thermocouple 9 is input in a temperature controller 10 of the electric furnace 8 as shown by the solid arrow in the drawing and the temperature controller 10 functions to control a heating temperature of the electric furnace 8 based on the input from the thermocouple 9.

The gas introducing tube 6 and the gas exhausting tube 7 are formed such that the bottom ends thereof project in 3 mm downwardly from the plug 4. Also, the upper part of the reaction container 3 projects from the electric furnace 8 to be exposed to atmosphere. Therefore, steam of sulfur generating from the starting material due to heating of the reaction container 3 is raised to the upper part of the reaction container 3 as shown by the long dashed short dashed line arrow in the drawing, and transformed to a liquid drop while being cooled to be dropped and refluxed as shown by the broken line arrow in the drawing. Consequently, sulfur in the reaction system does not leak to the outside through the gas exhausting tube 7.

The gas introducing tube 6 is continuously supplied with Ar gas from a gas supply system which is not shown. The gas exhausting tube 7 is connected to a trapping bath 12 containing an aqueous solution 11 of sodium hydroxide. The exhaust gas moving toward the outside through the gas exhausting tube 7 from the reaction container 3 is released to the outside after passing through the aqueous solution 11 of sodium hydroxide in the trapping bath 12. Therefore, even if hydrogen sulfide gas generated from a vulcanization reaction is included in the exhaust gas, the hydrogen sulfide gas is removed therefrom by being neutralized with the aqueous solution of sodium hydroxide.

(Heat Treatment Process)

Heating with the electric furnace 8 was started 30 minutes after starting a continuous supply of Ar gas to the reaction container 3 holding the starting material 2 in its bottom at a flow rate of 80 ml/minute from the gas supply system. The heating was conducted in the temperature elevation rate of 300° C./h. When the temperature of the starting compound reached 450° C., heat treatment was conducted for two hours while maintaining the temperature of 450° C. Then, the temperature of the reaction product was cooled naturally under an Ar gas atmosphere to 25° C. while adjusting the flow rate of the Ar gas and a product was taken out of the reaction container 3.

(Removal of Unreacted Sulfur)

In order to remove the unreacted sulfur (free elemental sulfur) remaining in the product after the heat treatment step, the following step was carried out. Namely, the product was pulverized in a mortar and 2 g of a pulverized product was put in a glass tube oven and heated for three hours at 250° C. while vacuum suction was conducted to produce a sulfur-based active material in which unreacted sulfur was removed (or only a trace amount of unreacted sulfur was contained). The temperature elevation rate was 10° C./minute.

<Preparation of Lithium-Ion Secondary Battery>

(Sulfur-Based Negative Electrode)

To the above obtained sulfur-based active material were mixed acetylene black as an electrically-conductive additive and an acrylic copolymer ("AQUACHARGE" manufactured by Sumitomo Seika Co., Ltd.) as a binder. The mass ratio of the mixture was sulfur-based active material:acetylene black:AQUACHARGE=90:5:5. To the mixture was added an NMP solvent for adjusting viscosity to prepare slurry. This slurry was applied on a current collector consisting of an aluminum foil and pre-dried at 80° C. for 20 minutes under atmosphere. Further dryness at 150° C. for three hours under reduced pressure was conducted to obtain a sulfur-based negative electrode. The sulfur-based negative electrode was stamped out to an electrode size having a diameter of 11 mm and applied for a test battery.

(Positive Electrode)

As a positive-electrode active material, $LiNi_{0.5}Mn_{1.5}O_4$, acetylene black as an electrically-conductive additive and a polyvinylidene difluoride (PVdF) as a binder were mixed. The mass ratio of the mixture was $LiNi_{0.5}Mn_{1.5}O_4$:acetylene black:PVdF=90:5:5. To the mixture was added an NMP solvent for adjusting viscosity to prepare slurry. This slurry was applied on a current collector consisting of an aluminum foil and pre-dried at 80° C. for 20 minutes under atmosphere. Further dryness at 150° C. for three hours under reduced pressure was conducted to obtain an electrode.

On the electrode was applied PVdF ("Kynar" manufactured by ARKEMA Inc.), which has been gelated by acetone, by use of a doctor blade having a thickness of 20 μm. This electrode was dried at 150° C. for three hours to obtain a gel-coated positive electrode. The gel-coated positive electrode was stamped out to an electrode size having a diameter of 11 mm and applied for a test battery.

(Lithium-Ion Secondary Battery)

The above positive electrode and the negative electrode were used to prepare a whole battery. The above positive electrode and the negative electrode were sealed hermetically with a crimping machine in a member for CR2032-type coin battery (manufactured by HOSEN Co., Ltd.) made of a stainless-steel container, using a glass filter (GA100 manufactured by ADVANTEC Co., Ltd.) as a separator and a nonaqueous electrolyte consisting of 1 mol/L of Lin $(SO_2CF_3)_2$ and sulfolane as an electrolyte, to obtain a CR2032 coin-type lithium-ion secondary battery.

Example 2

In Example 2, the negative-electrode active material obtained in Example 1 was used and a secondary battery was prepared according to the similar process as that of Example 1 except that the positive-electrode active material was changed to $LiMn_2O_4$.

Example 3

In Example 3, a secondary battery was prepared in the same manner as in Example 1 except that the polymer compound 1 was changed to the polymer compound 2 in the production of the negative-electrode active material.

Comparative Example 1

The negative-electrode active material obtained in Example 1 was used and a secondary battery was prepared according to the similar process as that of Example 1 except that a gel-coating treatment on the positive electrode was not conducted.

Comparative Example 2

The negative-electrode active material obtained in Example 1 was used and a secondary battery was prepared according to the similar process as that of Example 1 except that ethylene carbonate (EC)/diethyl carbonate (DEC)=1/1 (volume) was used as an electrolyte.

<Measuring Test of Charging and Discharging Capacity>

As to the batteries prepared in Example 1, Example 3, Comparative Example 1 and Comparative Example 2, charging and discharging were repeated between an upper limit of 3.7 V and a lower limit of 1.5 V, and as to the battery prepared in Example 2, charging and discharging were repeated between an upper limit of 2.8 V and a lower limit of 0.7 V. The current value was 0.5 C rate (70 mA per 1 g of the positive-electrode active material in Example 1, Example 3, Comparative Example 1 and Comparative Example 2; 55 mA per 1 g of the positive-electrode active material in Example 2). The temperature at test was 30° C.

<Elemental Analysis>

As a result of measuring sulfur amounts of the sulfur-based negative-electrode active materials produced in Example 1 and Example 3, the sulfur amounts were 55.2% and 53.8%, respectively. It is noted that a full automatic elemental analysis device vario MICRO cube manufactured by Elementar Analysensysteme GmbH was used for the measurement.

Figure 1:
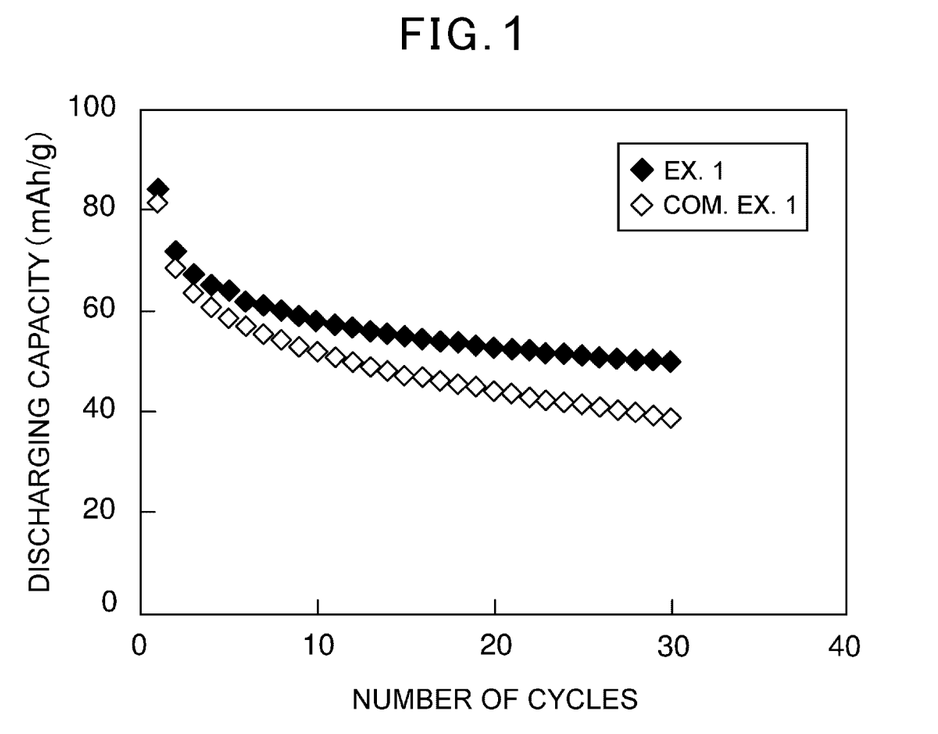
FIG. 1 is a graph showing a result of cyclic charging and discharging in Example 1 and Comparative Example 1.

As shown in FIG. 1, it can be seen that an application of a gelcoat on a positive electrode leads to improvement of cyclability. Comparing a capacity at the 30th cycle to an initial capacity, the capacity retention rate was 59.3% with a gelcoat while the discharging capacity was only 47.6% without a gelcoat. In addition, as shown in Table 1, while the voltage of Example 2 is lower than that of Example 1 by 0.8 V, Example 2 has higher capacity retention rate. The reason therefor is considered that the lower voltage of the positive-electrode active material prevents oxidization of a lithium sulfide dissolved into the electrolyte.

Moreover, when sulfolane, which has a high viscosity, is selected as an electrolyte, an elution to a lithium polysulfide is difficult to arise, which is considered to have an effect on the capacity retention rate.

According to the present disclosure, it is possible to provide a metal-ion secondary battery with improved cyclability by using a known gel-coating technique by use of a material which is easily available and inexpensive.

EXPLANATION OF SYMBOLS

1 Reaction apparatus
2 Starting material
3 Reaction container
4 Silicone plug
5 Alumina protection tube
6 Gas introducing tube
7 Gas exhausting tube
8 Electric furnace
9 Thermocouple
10 Temperature controller
11 Aqueous solution of sodium hydroxide
12 Trapping bath

What is claimed is:
1. A method for producing a metal-ion secondary battery comprising a negative electrode comprising a sulfur-containing compound as a negative-electrode active material, a positive electrode and an electrolyte, wherein the positive electrode has a polymer gel layer on a surface thereof, the method comprising:
obtaining the negative-electrode active material by subjecting a starting material comprising a polymer represented by the following formula (1) or formula (2):

TABLE 1

|  | Example 1 | Example 2 | Example 3 | Comparative Example 1 | Comparative Example 2 |
| --- | --- | --- | --- | --- | --- |
| Battery |  |  |  |  |  |
| Polymer compound for negative-electrode active material | Polymer compound 1 | Polymer compound 1 | Polymer compound 2 | Polymer compound 1 | Polymer compound 1 |
| Positive-electrode active material | $LiNi_{0.5}Mn_{1.5}O_4$ | $LiMn_2O_4$ | $LiNi_{0.5}Mn_{1.5}O_4$ | $LiNi_{0.5}Mn_{1.5}O_4$ | $LiNi_{0.5}Mn_{1.5}O_4$ |
| Polymer layer (gelcoat) | Present | Present | Present | Absent | Absent |
| Electrolyte | Sulfolane | Sulfolane | Sulfolane | Sulfolane | EC/DEC |
| Evaluation |  |  |  |  |  |
| Average discharging voltage (V) | 2.5 | 1.7 | 2.5 | 2.5 | 2.5 |
| Discharging capacity at 2nd cycle (mAh/g) | 83.9 | 68.6 | 64.3 | 81.4 | 81.6 |
| Capacity retention rate (30th/2nd) (%) | 59.3 | 68.4 | 66.7 | 47.6 | 39.8 |

(1)

wherein $R^1$ represents a hydrogen atom or an alkyl group, $X^1$ represents a group having a monovalent functional group containing a hetero atom selected from the group consisting of O, S, P and N, or a group having a heterocyclic group containing a hetero atom selected from the group consisting of O, S, P and N, and "n" represents an integer;

(2)

wherein $R^2$ represents an alkyl group, "a" represents an integer of 2 to 4, and "m" represents an integer of 2 to 12, and sulfur to heat-treatment under a non-oxidizing atmosphere, and wherein a polymer used for the polymer gel layer is at least one of polyvinyl alcohol, polyethylene glycol, polyvinylidene fluoride, polyethylene oxide, polyacrylamide, polyacetal, sodium polyacrylate, carboxymethyl cellulose, polyvinyl chloride, polycarbosilane, copolymer comprising 2-hydroxyethyl methacrylate as a monomer, gelatin, or agar.

2. The method for producing a metal-ion secondary battery of claim 1, wherein the electrolyte comprises sulfolane as a solvent.

3. The method for producing a metal-ion secondary battery of claim 1, wherein the positive electrode comprises a positive-electrode active material enabling lithium ion occlusion/release.

4. The method for producing a metal-ion secondary battery of claim 3, wherein the positive-electrode active material is at least one selected from the group consisting of a lithium transition metal oxide and a lithium transition metal oxide derivative.

5. The method for producing a metal-ion secondary battery of claim 3, wherein the positive-electrode active material is a lithium-manganese composite oxide.

6. The method for producing a metal-ion secondary battery of claim 5, wherein the lithium-manganese composite oxide is at least one selected from the group consisting of $LiNi_{1/3}Co_{1/3}Mn_{1/3}O_2$, $LiMn_2O_4$, $LiNi_{0.5}Mn_{1.5}O_4$ and $Li_2MnO_3$-$LiMO_2$ (wherein M is one or more selected from the group consisting of Ni, Co and Mn).

7. The method for producing a metal-ion secondary battery of claim 1, wherein a weight-average molecular weight of the polymer compound is 2,000 to 1,500,000.

8. The method for producing a metal-ion secondary battery of claim 1, wherein the starting material to be heat-treated further comprises an electrically-conductive carbon material.

9. The method for producing a metal-ion secondary battery of claim 8, wherein the electrically-conductive carbon material is a carbon material having a graphite structure.

10. The method for producing a metal-ion secondary battery of claim 1, wherein a total sulfur amount in the negative-electrode active material is not less than 50.0% by mass.

11. The method for producing a metal-ion secondary battery of claim 1, wherein a temperature of the heat-treatment is within a range of 250° C. to 550° C.

* * * * *